US007236666B2

(12) United States Patent
Towle et al.

(10) Patent No.: US 7,236,666 B2
(45) Date of Patent: Jun. 26, 2007

(54) ON-SUBSTRATE MICROLENS TO COUPLE AN OFF-SUBSTRATE LIGHT EMITTER AND/OR RECEIVER WITH AN ON-SUBSTRATE OPTICAL DEVICE

(75) Inventors: Steven Towle, deceased, late of Phoenix, AZ (US); by Anna George, legal representative, Sunnyvale, CA (US); Henning Braunisch, Chandler, AZ (US); Daoqiang Lu, Chandler, AZ (US); Gilroy J. Vandentop, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 10/955,553

(22) Filed: Sep. 30, 2004

(65) Prior Publication Data

US 2006/0067606 A1 Mar. 30, 2006

(51) Int. Cl.
*G02B 6/32* (2006.01)

(52) U.S. Cl. .............................. 385/33; 385/15; 385/31

(58) Field of Classification Search .................. 385/15, 385/31, 33
See application file for complete search history.

(56) References Cited

U.S. PATENT DOCUMENTS

| 5,465,860 | A | 11/1995 | Fujimoto et al. |
|---|---|---|---|
| 6,374,020 | B1 | 4/2002 | Paniccia |
| 6,393,169 | B1 | 5/2002 | Paniccia et al. |
| 6,504,965 | B2 | 1/2003 | Paniccia et al. |
| 6,512,861 | B2 | 1/2003 | Chakravorty et al. |
| 6,556,764 | B2 | 4/2003 | Crafts |
| 6,580,863 | B2 | 6/2003 | Yegnanarayanan et al. |
| 6,586,726 | B2 | 7/2003 | Verdiell |
| 6,587,605 | B2 | 7/2003 | Paniccia et al. |
| 6,628,865 | B2 | 9/2003 | Crafts |
| 6,660,548 | B2 | 12/2003 | Naydenkov et al. |
| 6,661,943 | B2 | 12/2003 | Li |
| 6,684,015 | B2 | 1/2004 | Johannessen |
| 6,694,076 | B2 | 2/2004 | Crafts |
| 6,700,464 | B2 | 3/2004 | Ling et al. |
| 6,707,970 | B2 | 3/2004 | Crafts |
| 6,731,843 | B2 | 5/2004 | Murali |
| 6,736,552 | B2 | 5/2004 | Martwick |
| 6,751,379 | B2 | 6/2004 | Capewell et al. |
| 6,754,407 | B2 | 6/2004 | Chakravorty et al. |
| 6,810,160 | B2 * | 10/2004 | Sugama et al. ............... 385/14 |

(Continued)

OTHER PUBLICATIONS

Timothy P. Kennedy, "Understanding Ball Lenses," Edmund Optics Inc., 2004, 3 pages.

(Continued)

*Primary Examiner*—Jennifer Doan
(74) *Attorney, Agent, or Firm*—Blakely, Sokoloff, Taylor & Zafman LLP

(57) ABSTRACT

Optical apparatus, methods of forming the apparatus, and methods of using the apparatus are disclosed herein. In one aspect, an optical apparatus may include a substrate, an on-substrate microlens coupled with the substrate to receive light from an off-substrate light emitter and focus the light toward a focal point, and an on-substrate optical device coupled with the substrate proximate the focal point to receive the focused light. Communication of light in the reverse direction is also disclosed. Systems including the optical apparatus are also disclosed.

16 Claims, 8 Drawing Sheets

U.S. PATENT DOCUMENTS

| | | |
|---|---|---|
| 6,952,507 B2* | 10/2005 | Johnson et al. ............... 385/31 |
| 2005/0036728 A1 | 2/2005 | Braunisch |
| 2006/0051021 A1* | 3/2006 | Braunisch et al. ............ 385/33 |
| 2006/0067606 A1 | 3/2006 | Towle et al. |
| 2006/0067609 A1 | 3/2006 | Lu et al. |
| 2006/0067624 A1 | 3/2006 | Towle et al. |

OTHER PUBLICATIONS

Korobov, V., et al., "Characterization Methodology for Micro-Lens Performance in CMOS Image Sensors," 2001 IEEE Workshop on Charge-Coupled Devices and Advanced Image Sensors, Jun. 7-9, 2001, Lake Tahoe, Nevada, 4 pages.

* cited by examiner

ON-SUBSTRATE MICROLENS TO COUPLE AN OFF-SUBSTRATE LIGHT EMITTER AND/OR RECEIVER WITH AN ON-SUBSTRATE OPTICAL DEVICE

BACKGROUND

1. Field

An embodiment of the invention relates to an apparatus including a microlens.

2. Background Information

The alignment of an optical fiber, waveguide, or other light emitter and/or receiver with an optical device on a die or other substrate may be challenging. An active alignment process may be used to improve the alignment. However, the active alignment process may tend to be time consuming and expensive.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
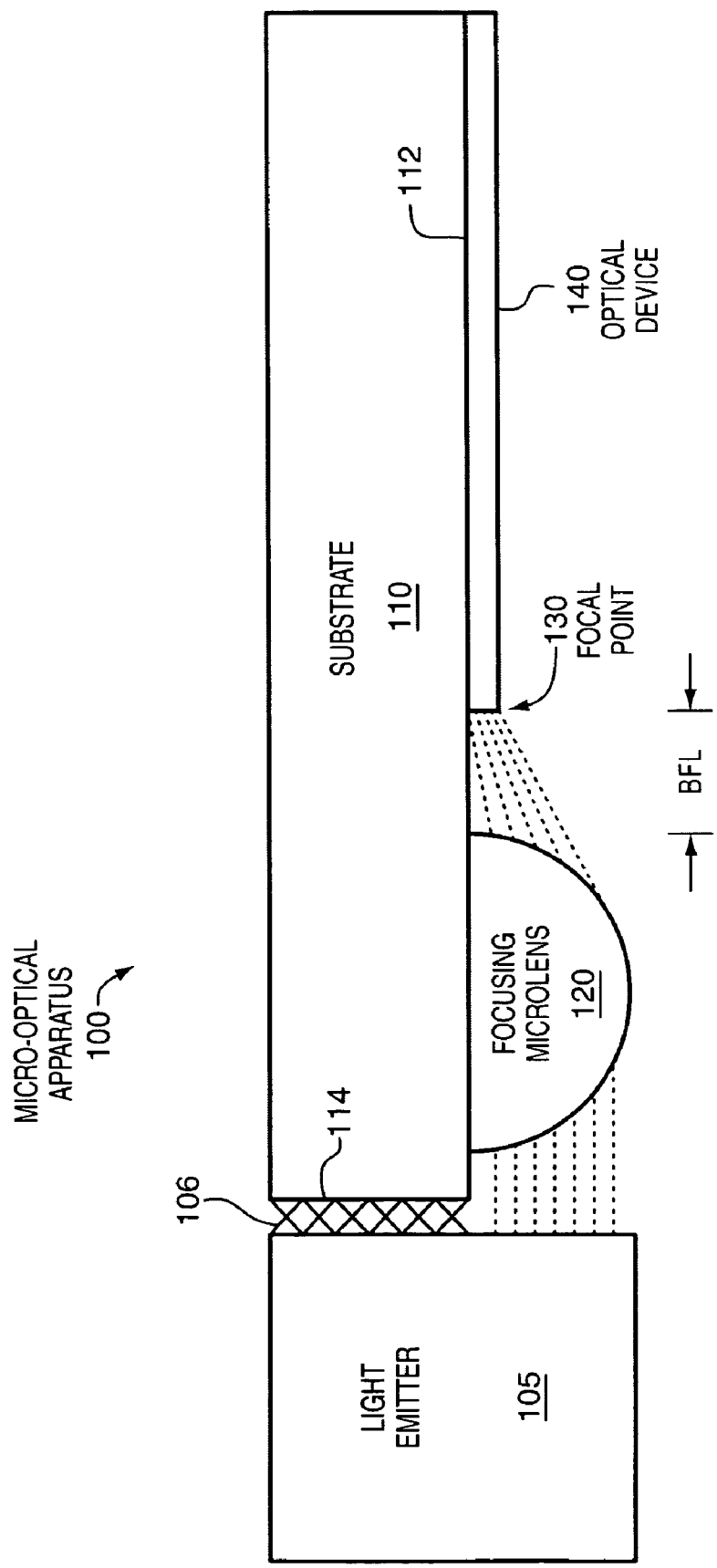
FIG. 1 shows an enlarged cross-sectional view of an optical apparatus that is coupled with an off-substrate light emitter, according to one or more embodiments of the invention.

FIG. 1 shows an enlarged cross-sectional view of an optical apparatus 100 that is coupled with an off-substrate light emitter 105, according to one or more embodiments of the invention. The optical apparatus includes a substrate 110, such as, for example, a die, other microelectronic device, or printed circuit, an on-substrate focusing microlens 120 that is coupled with the substrate to receive light from the off-substrate light emitter, and focus the light toward, but not necessarily to, a focal point 130, and an on-substrate optical device 140, such as, for example, in the illustrated embodiment a waveguide, that is coupled with the substrate proximate, but not necessarily at, the focal point, to receive the focused light. The optical apparatus is shown coupled with the light emitter, although the invention is not limited in this respect. In one or more alternate embodiments the optical apparatus may be provided in an uncoupled form, such as, for example, physically and optically uncoupled from the light emitter.

Suitable light emitters include, but are not limited to, lasers, laser diodes, Vertical Cavity Surface Emitting Lasers (VCSELs), light emitting diodes (LEDs), and the like. Light transmitters may also optionally be used for the light emitter. Suitable light transmitters include, but are not limited to, waveguides, such as, for example, multimode polymer waveguides, optical fibers, illuminated slits or holes, and the like.

In one or more embodiments of the invention, the light emitter may include a collimated light emitter. An example of a collimated light emitter may include an optical fiber having a collimating microlens coupled with an end thereof. The collimating microlens, such as, for example, a spheroidal lens, may help to refract or otherwise bend divergent light transmitted from the terminal end of the optical fiber to create a collimated light. In true collimated light, the rays are parallel and do not diverge or converge. However, in practice, the rays may not be perfectly parallel, and the invention is not limited to true collimated light having perfectly parallel rays.

The use of collimated light may help to relax the importance of accurately positioning the off-substrate light emitter in close proximity to the on-substrate microlens. Compared to divergent light, the collimated light tends not to diverge or spread out as much. This may allow the optical signal to be communicated over a larger distance without significant dilution or loss of signal strength. Relaxing the importance of accurately positioning the off-substrate light emitter may help to speed up alignment and may generally reduce manufacturing time and/or costs. However, the invention is not limited to the use of a collimated light emitter.

As shown, the light emitter may be placed in proper position relative to the on-substrate focusing microlens and coupled with the optical apparatus and/or with the substrate, such as, for example, with an optional adhesive or other fastener 106. In the illustrated orientation, the substrate has a lower surface 112 or face and a left vertical edge 114, although the invention is not limited to this particular orientation. It should be noted that terms such as "lower", "upper", "top", "bottom", "right", "left", "vertical", "horizontal", and the like, are used herein to facilitate the description of the structure of the package "as illustrated". It will be evident that the apparatus may be used in a variety of different orientations including, but not limited to, an inverted orientation, in which the microlens and optical device overly an upper surface of the substrate.

As shown, in one or more embodiments, the light emitter may optionally be coupled at or near the edge of the substrate, although this is not required. As further shown, in one or more embodiments, the light emitter may be coupled so as to provide light edgewise towards the microlens in a direction that may be substantially parallel to a surface of the substrate. In this context, unless stated otherwise, the term "substantially parallel" means that the light has an angle that is from −30° to 30° relative to the surface of the substrate where the on-substrate focusing microlens may be coupled.

The microlens is coupled with the substrate and may receive the light from the light emitter. In one or more embodiments of the invention, the microlens may be coupled with the surface of the substrate proximate the light emitter, or at least proximate an intended position where the light emitter may be coupled. In this context, unless stated otherwise, "proximate" means that the microlens and light emitter are within about 5 millimeters (mm, one thousandth of a meter) of one another. As shown in the illustrated embodiment, the microlens may be coupled with the surface of the substrate proximate an edge where the light emitter may be coupled. In the illustrated embodiment, the focusing microlens is coupled with the lower surface of the substrate, although as previously stated the invention is not limited to this particular orientation.

The focusing microlens may include a shaped material that is transparent in the wavelength range or ranges intended for use and having at least one convex, converging, or otherwise curved surface to bend or refract light toward a focal point. In one or more embodiments of the invention, the microlens may include a minute lens having at least one dimension, such as, for example, a diameter, or other cross-sectional dimension, that may be less than about 1000 micrometers (μm), although this is not required. In some embodiments of the invention, such as, for example, where size restraints are imposed by the particular implementation, a smaller lens may be used. For example, a smaller lens may be used in a flip-chip implementation where the microlens may tend to increase the standoff height of the package. In various embodiments of the invention, the microlens may have a dimension, such as, for example, a diameter or height, that may be less than about 500 μm, 200 μm, or 100 μm. Embodiments of the invention are not limited to any know size or dimension of the microlens.

As shown in the illustrated embodiment, the microlens may have the shape of a hemi-spheroid, although this is not required. As used herein, the term "hemi-spheroid" may be used to refer to a lens having the shape of a true hemi-sphere as well as lenses having only roughly or approximately hemi-spherical shapes. In particular, the lens need not include precisely "half" a sphere or spheroid, but may rather include either more or less than half. Nor is it required that the surface be precisely spherical or otherwise ellipsoidal. Now, the invention is not limited to the use of a hemi-spheroidal microlens. Other suitable lenses include, but are not limited to, spherical and spheroidal lenses. Still further, lenses with other shapes, such as, for example, aspheric lenses, which are non-spherical in cross section, and anamorphic lenses having differing curvature on each axis, are also suitable. Suitable examples include, but are not limited to, those with hyperboloidal and/or ellipsoidal and/or planar surfaces. In one or more embodiments, a ray tracing analysis or other optical design protocol may be used to determine a shape or shapes for the lens that provide good optical coupling.

The microlens may bend or otherwise refract the received light towards the focal point. The focal point may represent the point to which rays of light converge when passed through the microlens. It is not required that the focused light reach or achieve the focal point. As will be discussed further below, the optical device may optionally be coupled between the microlens and the focal point to receive partially focused light.

Figure 2:
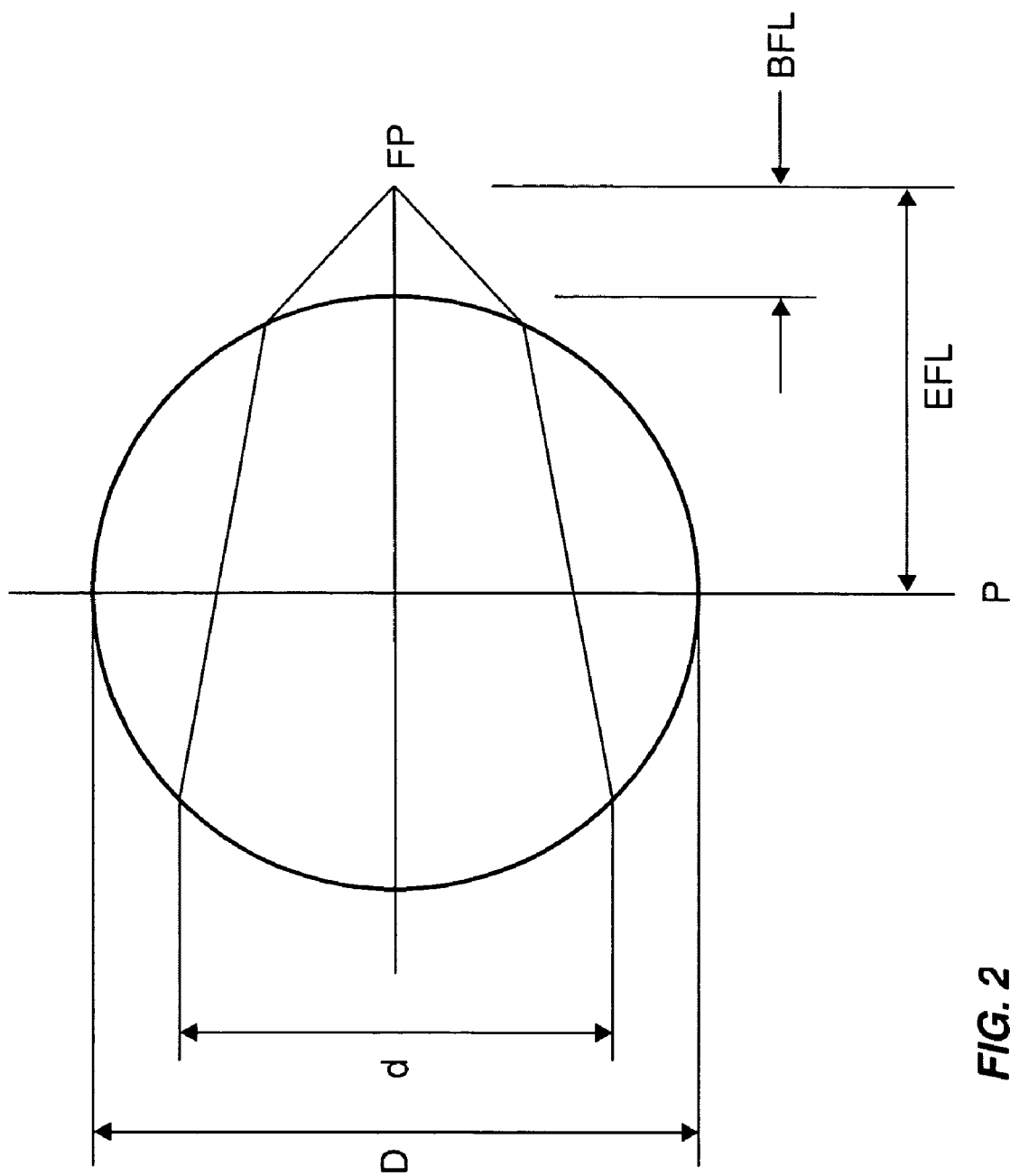
FIG. 2 shows a spherical ball lens focusing a beam of light to a focal point, according to one aspect.

To further illustrate certain concepts, FIG. 2 shows how a spherical ball lens may focus a beam of light to a focal point, according to one aspect. As shown, a beam of collimated light with a diameter or other cross-sectional dimension (d) may be provided to the spherical ball lens, which has a larger diameter (D). The beam may be centered about the horizontal, equatorial plane of the sphere, although this is not required. Misalignment may be allowed. In one aspect, the capability of a spherical and/or spheroidal lens to "steer" the rays of light toward the focal point may help to relax the importance of accurately aligning or centering the beam on the lens. The same may be true for a hemi-spheroidal lens.

As shown, the spherical ball lens may focus the beam to a focal point (FP). As shown for this particular case of a spherical ball lens receiving a horizontal beam of collimated light, the focal point may be located in a horizontal plane including the equatorial plane of the lens. The horizontal distance from the vertical center plane (P) of the lens to the focal point may be referred to as the effective focal length (EFL). The horizontal distance from the focal point to the closest point on the lens may be referred to as the back focal length (BFL). The EFL and BFL may be estimated using the following relationships:

$$EFL = nD/[4(n-1)]$$

$$BFL = EFL - D/2$$

in which "n" is the index of refraction of the lens. Other lenses also have EFLs and BFLs, although they may be estimated using different equations, depending upon the shape of the lens.

To further illustrate, consider a hemi-spherical microlens with a diameter of 140 μm, and an index of refraction of 1.5, which may be representative of various polymeric materials. For this lens, the EFL and BFL may be estimated using the equations above, as follows:

$$EFL = 1.5 \times 140 \ \mu m/[4 \times (1.5-1)] = 105 \ \mu m$$

$$BFL = 105 \ \mu m - 140 \ \mu m/2 = 35 \ \mu m$$

In this particular case, the focal point may be located about 35 μm away from the nearest point on the lens in the same plane as the equatorial base plane.

Referring again to FIG. 1, the microlens may focus the light toward the focal point. In the illustrated embodiment, the focal point may be located a horizontal distance away from the microlens near the lower surface of the microelectronic device. As discussed above, a hemi-spherical microlens may tend to refract the horizontally received collimated beam of light in the vertical direction toward the horizontal plane that includes the equatorial base plane of the hemi-spheroidal microlens.

With continued reference to FIG. 1, the on-substrate optical device 140 may be coupled with the substrate to receive the focused light. In the illustrated embodiment of the invention, the optical device includes a waveguide. As shown, the base of the planar waveguide may be adjacent to the surface of the substrate, which may approximately correspond to the equatorial base plane of the hemi-spheroidal microlens. The invention is not limited to the illustrated waveguide. In one or more embodiments of the invention, the optical device may include a mirror, microlens, optical fiber, photodiode, avalanche photodiode, other optical-electronic transducer, or other optical receiver, to name just a few examples. The invention is not limited to just these named optical devices.

In one or more embodiments, at least a portion of the on-substrate optical device, such as, for example, an optical coupling portion, may be coupled with the surface of the substrate at the focal point of the microlens. For example, as shown in the illustrated embodiment, an end or face of the waveguide may be coupled with the surface of the substrate at the focal point of the microlens. However, positioning the coupling portion of the optical device precisely at the focal point is not required. As shown in FIG. 2, some focusing may take place within the interior of the microlens, such that even placing the optical device against the surface of the microlens may offer some advantage of coupling focused light with the optical device.

Accordingly, in one or more embodiments of the invention, at least a portion of the on-substrate optical device, such as, for example, an end of a waveguide or other coupling portion, may be coupled with the surface of the substrate proximate the focal point of the microlens. In this context, unless otherwise specified, "proximate" means within 0.5 to 1.5 times the BFL away from the nearest point on the microlens. In some embodiments, it may be appropriate to position the coupling portion closer to the focal point, such as, for example, within 0.75 to 1.25 times the BFL away from the nearest point on the microlens. However, in other embodiments, it may be sufficient to position the coupling portion within 0 to 2 times the BFL away from the nearest point on the microlens.

The optical device, such as, for example, the illustrated waveguide, may receive the focused light. The waveguide may confine and guide or direct the light from the end or face where it may be received to an opposing terminal end or face that may provide the light to another light receiver, such as, for example, a photodetector or other optical-electrical transducer of the substrate. However, the invention is not limited to any know use or destination of the light provided to the on-substrate optical device.

In one or more embodiments of the invention, the focusing of the light by the microlens may allow a larger beam of light from the off-substrate light emitter to be coupled with a relatively smaller on-substrate optical device, such as, for example, the illustrated on-substrate waveguide, which may be smaller than the light emitter. Further, in one or more embodiments of the invention, the microlens may help to steer the light toward the focal point. This may help to relax the importance of accurately aligning or centering a beam of light on the microlens and/or on the on-substrate optical device. In one or more embodiments of the invention, the microlens may allow the off-substrate light emitter to be optically coupled with the on-substrate optical device by using a passive alignment operation, instead of an active alignment operation. However, the scope of the invention is not limited in respect to these potential advantages.

Figure 3:
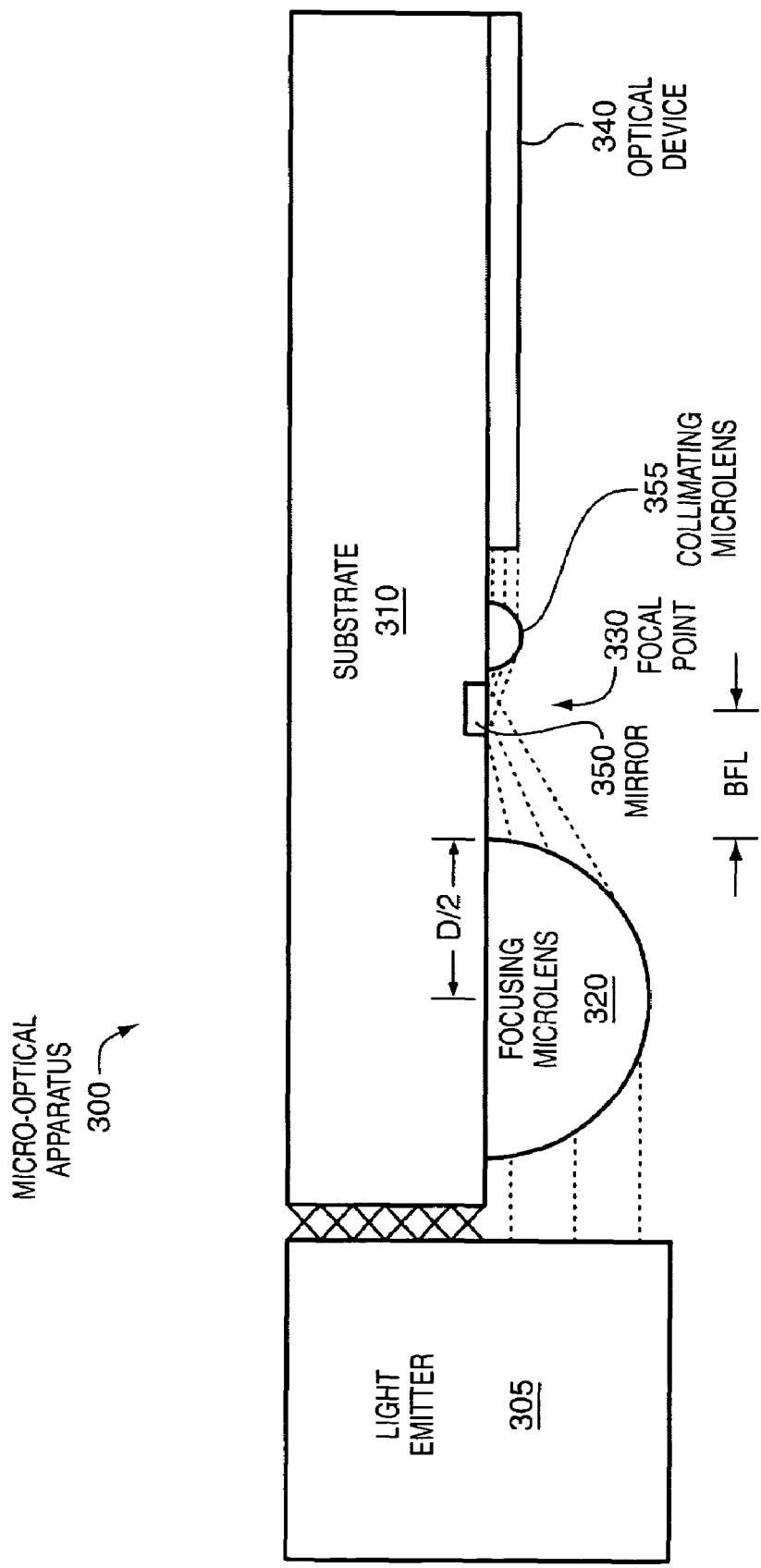
FIG. 3 shows an enlarged cross-sectional view of an optical apparatus that is coupled with an off-substrate light emitter, according to one or more other embodiments of the invention.

FIG. 3 shows an enlarged cross-sectional view of an optical apparatus 300 that is coupled with an off-substrate light emitter 305, according to one or more embodiments of the invention. The optical apparatus includes a substrate 310, an on-substrate focusing microlens 330 that is coupled with the substrate to receive light from the off-substrate light emitter and focus the light toward, but not necessarily to, a focal point 330. The substrate, focusing microlens, light emitter, and focal point may optionally have some or all of the characteristics of the correspondingly named components of the micro-optical apparatus 100 shown in FIG. 1. To avoid obscuring the following description, the discussion below will primarily focus on the different and/or additional structures and characteristics of the micro-optical apparatus 300.

The optical apparatus further includes an optical device, such as, for example, in the illustrated embodiment, an on-substrate micromirror 350, which may be coupled with the surface of the substrate. As shown, in one or more embodiments of the invention, at least a portion of the micromirror, such as, for example, a central portion, may be coupled with the substrate proximate, but not necessarily directly at, the focal point of the on-substrate microlens. A relatively small micromirror is shown in the illustrated embodiment, although this is not required and a larger mirror may also optionally be included.

The micromirror may receive the focused light and reflect the light. The micromirror may include a reflective material, such as, for example, a reflective metal, or layers of alternating refractive index. Suitable reflective metals include, but are not limited to, silver, aluminum, copper, gold, platinum, chromium, nickel, titanium, and combinations thereof. In one or more embodiments of the invention, the micromirror may include a portion of metal patterned from a top layer metal or base layer metal of the substrate, although this is not required. In the illustrated embodiment, the micromirror may be embedded in the surface of the substrate, although the invention is not limited in this respect. In one or more other embodiments of the invention, the reflective material of the micromirror may optionally be deposited on or over the surface of the substate, such as, for example, by vapor deposition or plating.

Referring again to FIG. 3, the optical apparatus further includes a collimating microlens 355 that may be coupled with the surface of the substrate to receive the reflected light from the micromirror. The reflected light from the micromirror may be relatively more divergent than the focused light received by the micromirror. The collimating microlens may bend or otherwise refract the received light and produce a less divergent light, such as, for example, a collimated light.

The collimating microlens may include a shaped material that is transparent to light in the wavelength or range of wavelengths to be conveyed therethrough and having at least one convex, converging, or otherwise curved surface to bend or refract light. As shown in the illustrated embodiment, the microlens may have the shape of a hemi-spheroid, although this is not required. Other shapes mentioned as being suitable for the focusing microlens are also suitable for the collimating microlens.

In one or more embodiments of the invention, the collimating microlens may be smaller than the focusing microlens. For example, in various embodiments, the collimating microlens may have a diameter or other cross-sectional dimension, which may be from about $1/10$ to $1/2$ that of the focusing lens. Further, as shown in the illustrated embodiment, the height of the collimating microlens may optionally be comparable with the height of an on-substrate waveguide, such as, for example, to help couple collimated light with the end or face of the waveguide.

In one or more embodiments of the invention, the collimating microlens may be coupled with the surface of the substrate at a position that may be from about 0 to 0.5 times the BFL of the focusing microlens away from the focal point, which may optionally be substantially centered on the micromirror. However, this may depend upon the size of the collimating microlens, and the invention is not limited to this particular positioning of the collimating microlens.

The optical apparatus further includes an optical device 340, such as, for example, in the illustrated embodiment, a waveguide, which may be coupled with the surface of the substrate to receive the relatively less divergent or collimated light from the collimating microlens. The waveguide, which is not the only suitable optical device, may optionally have some or all of the characteristics of the aforementioned waveguide. The end or face of the waveguide, or other coupling portion of the optical device, may be positioned close to the collimating microlens to provide for good optical coupling, although this is not required.

A potential advantage of including the micromirror and collimating microlens may be a reduction in the numerical aperture of the optical coupling of light with the waveguide compared to the case where focused light may be provided directly from the focusing microlens to the waveguide. The smaller numerical aperture may facilitate optically coupling a large beam of light from the light emitter into a waveguide having a relatively small numerical aperture. The numerical aperture of a waveguide may be determined according to $NA=\sin(\alpha)$, where $\alpha$ may represent a critical angle away from the waveguide axis beyond which rays impinging on the end or face of the waveguide may not couple to the waveguide.

Figure 4:
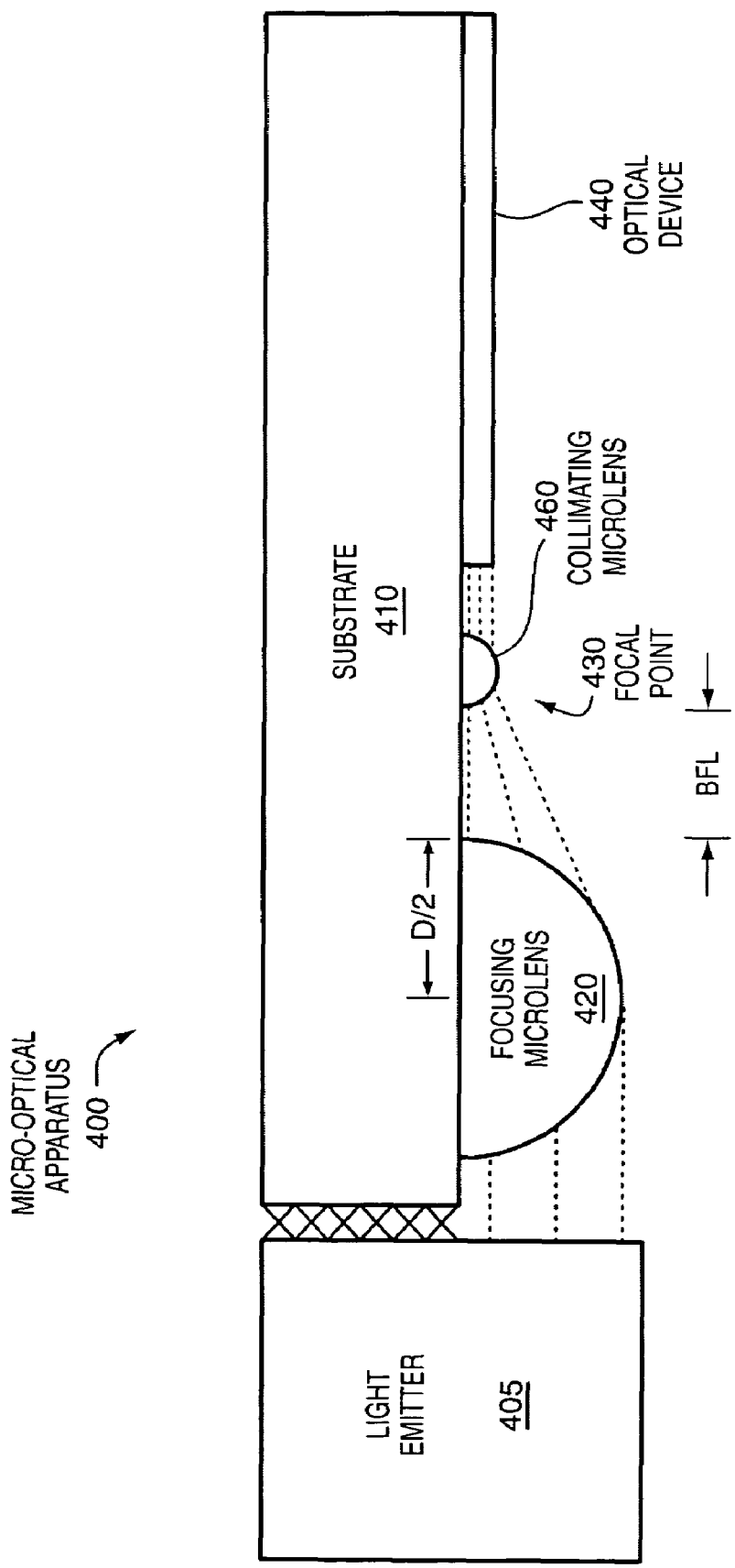
FIG. 4 shows an enlarged cross-sectional view of an optical apparatus that is coupled with an off-substrate light emitter, according to one or more further embodiments of the invention.

FIG. 4 shows an enlarged cross-sectional view of an optical apparatus 400 that is coupled with an off-substrate light emitter 405, according to one or more embodiments of the invention. The optical apparatus includes a substrate 410, an on-substrate focusing microlens 420 that is coupled with the substrate to receive light from the off-substrate light emitter and focus the light toward, but not necessarily to, a focal point 430. The optical apparatus 400 also includes an optical device 440. The substrate, focusing microlens, light emitter, focal point, and optical device may optionally have some or all of the characteristics of the correspondingly named components of the micro-optical apparatus 100 shown in FIG. 1. To avoid obscuring the following description, the discussion below will primarily focus on the different and/or additional structures and characteristics of the micro-optical apparatus 400.

The optical apparatus further includes a collimating microlens 460 that may be coupled with the surface of the substrate to receive the focused light from the focusing microlens. The collimating microlens may bend or otherwise refract the light and produce a less convergent light, such as, for example, a collimated light.

The collimating microlens may include a shaped transparent that may be transparent at a wavelength or wavelengths of light to be passed there through and may have at least one convex, converging, or otherwise curved surface to bend or refract light. As shown in the illustrated embodiment, the microlens may have the shape of a hemi-spheroid, although this is not required. Other shapes mentioned as being suitable for the focusing microlens are also suitable for the collimating microlens.

In one or more embodiments of the invention, the collimating microlens may be smaller than the focusing microlens. For example, in various embodiments, the collimating microlens may have a diameter or other cross-sectional dimension, which may be from about 1/10 to 1/2 that of the focusing lens. Further, as shown in the illustrated embodiment, the height of the collimating microlens may optionally be comparable with the height of an on-substrate waveguide, such as, for example, to help couple the less convergent or collimated light with the end or face of the waveguide.

In one or more embodiments, the collimating microlens may be coupled with the surface of the substrate at or proximate the focal point of the focusing microlens. In this context, unless otherwise specified, "proximate" means within 0.5 to 1.5 times the BFL away from the nearest point on the focusing microlens. In some embodiments, it may be appropriate to position the collimating microlens closer to the focal point, such as, for example, at the focal point, or within 0.75 to 1.25 times the BFL away from the nearest point on the microlens. However, in other embodiments, it may be sufficient to position the collimating lens within 0 to 2 times the BFL away from the nearest point on the microlens. The size of the collimating microlens may depend at least in part on the positioning relative to the focal point.

The less convergent or collimated light may be provided to the optical device, such as, for example, the illustrated waveguide. As shown, the end of the waveguide or other coupling portion of the optical device may optionally be positioned close to the edge of the collimating microlens, although this is not required.

Now, to avoid obscuring the above description, embodiments of the invention have been described in the context of an off-substrate light emitter providing light to the on-substrate optical device, for example a waveguide, via at least the above-described focusing microlens. However, the scope of the invention is not limited to communication of light in this direction, or only in this direction. Light may also optionally be communicated in the reverse direction, or in both directions. For example, light may optionally be communicated from the on-substrate optical device, such as, for example, a waveguide, to an off-substrate light receiver.

Suitable light receivers include, but are not limited to, photodiodes, such as, for example, avalanche photodiodes, and other optical-to-electrical transducers, and mirrors, to name just a few examples. Other suitable light receivers include light transmitters, such as, for example, waveguides, optical fibers, and other light transmitters. As previously discussed, such light transmitters may optionally be used as light emitters, and accordingly are capable of both light emission and light reception.

To further illustrate, in one or more embodiments of the invention, the on-substrate optical device, such as, for example, a waveguide, may emit light. With reference to FIG. 1, the light may be emitted from the end of the waveguide, which as disclosed may optionally be located proximate the focal point. The light emitted may be at least somewhat divergent. In one aspect, a diverging microlens may be coupled with the end of the waveguide to render the emitted light more divergent, although this is not required. The emitted light may be received by the on-substrate microlens. Rather than the on-substrate microlens focusing the received light, the on-substrate microlens may instead collimate the light, or at least render it less divergent, and provide the light to an off-substrate light receiver, which may be located in the place of the illustrated off-substrate light emitter. The light may travel generally in the opposite direction as previously described above for the focusing microlens. In one or more embodiments, the off-substrate light receiver and/or emitter may include a light transmitter, such as, for example, an optical fiber or waveguide, which may optionally be used as both a light emitter and a light receiver.

Light may also optionally be communicated in the reverse direction, or in both directions, in the apparatus shown in FIGS. 3–4. The discussion in the preceding paragraphs is relevant to this point. In one or more embodiments of the invention, a collimating microlens, or other collimating device, may optionally be coupled with the end of the on-substrate waveguide, such as, for example, to help collimate the light emitted from the waveguide. However, this is not required.

FIGS. 5–10 show cross-sectional views representing different stages of a method of forming an optical apparatus similar that shown in FIG. 3, according to one or more embodiments of the invention.

Figure 5:
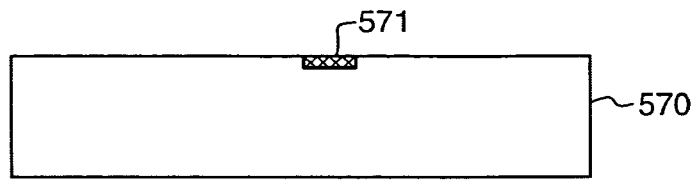
FIG. 5 shows forming a micromirror on a substrate, according to one or more embodiments of the invention.

FIG. 5 shows forming a micromirror 571 on a substrate 570, according to one or more embodiments of the invention. In one or more embodiments, forming the micromirror may include depositing a metal that may be reflective at the wavelength or range of wavelengths of operation over the surface of the substrate. Suitable methods for depositing the reflective metal include, but are not limited to, vapor deposition, such as, for example physical vapor deposition or chemical vapor deposition, and plating, such as, for example, electroplating. Alternatively, in one or more embodiments of the invention, the micromirror may be formed in a top layer metal or base layer metal of the substrate.

Figure 6:
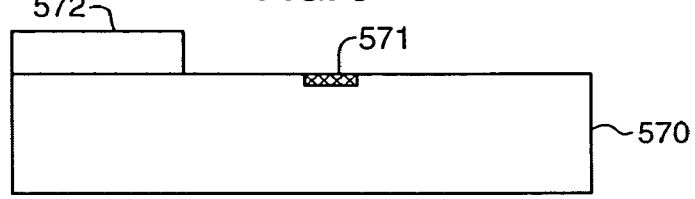
FIG. 6 shows forming a waveguide over the substrate of FIG. 5, according to one or more embodiments of the invention.

FIG. 6 shows forming a waveguide 572 over the substrate 570 of FIG. 5, according to one or more embodiments of the invention. In one or more embodiments of the invention, the waveguide may be formed by lithographically patterning a radiation-sensitive waveguide core material, such as, for example, benzocyclobutene. For example, benzocyclobutene may be spin-coated over a surface of the substrate, soft baked, exposed to patterned radiation, developed, and then hard baked. Alternatively, in one or more embodiments, a patterned resist layer may be used to selectively etch a waveguide core layer. Other methods of forming waveguides, such as, for example, photobleaching, may also optionally be used.

Figure 7:
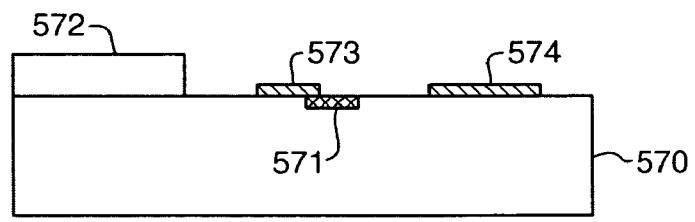
FIG. 7 shows forming an optional patterned wettable layer over the substrate of FIG. 6, according to one or more embodiments of the invention.

FIG. 7 shows forming a patterned wettable layer 573, 574 over the substrate 570 of FIG. 6, according to one or more embodiments of the invention. The patterned wettable layer includes a first portion 573 potentially corresponding in position to the collimating microlens 355, and a second portion 574 potentially corresponding in position to the focusing microlens 320. The patterned wettable layer may or may not overly a portion of the micromirror. As shown, the first portion for the collimating microlens may be smaller than the second portion for the focusing microlens. In one aspect, the sizes of the first and the second portions may be comparable to, or the same as, the equatorial base planes of the corresponding hemi-spheroidal microlenses.

The patterned wettable layer may include a wettable material that may have philicity rather than phobicity for a liquid material used to form the microlens, or a material of the microlens, and may be capable of being wetted by the liquid. For polymeric or otherwise organic liquid lens materials, suitable materials for inclusion in the wettable layer include, but are not limited to, organic materials, such as, for example, polymeric materials. One suitable polymeric material includes benzocyclobutene. Many other suitable organic materials, such as, for example, acrylics, epoxy, and polyimides, to name just a few, are known in the arts. Inorganic materials capable of being wetted by the liquid lens material may also optionally be used.

In one or more embodiments of the invention, the patterned wettable layer may be formed by forming a wettable layer including a radiation-sensitive material over the surface, such as, for example, by spin coating or vapor deposition, optionally soft baking the layer, exposing the layer to patterned radiation, developing the exposed layer, and then optionally hard baking the layer. Alternatively, in one or more other embodiments of the invention, the patterned wettable layer may be formed by forming a wettable layer over the surface of the substrate, such as, for example, by spin coating or vapor deposition, forming a resist layer over the wettable layer, patterning the resist layer by lithography and development, selectively etching the wettable layer according to the patterned resist layer, and then removing the patterned resist layer. Other methods of forming patterned layers may also optionally be used. The invention is not limited to any known thickness of the wettable layer, although a thickness ranging from about a monolayer to several micrometers may be sufficient.

Figure 8:
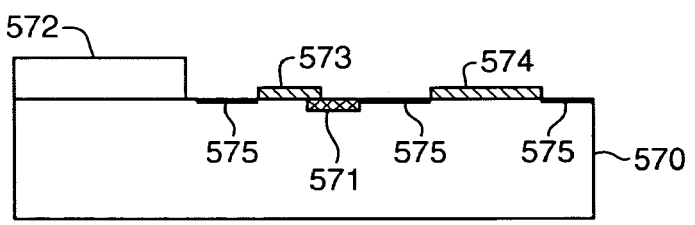
FIG. 8 shows forming an optional patterned non-wettable layer over and/or on exposed portions of the surface of the substrate and the surface of the micromirror of FIG. 7, according to one or more embodiments of the invention.

FIG. 8 shows forming an optional patterned non-wettable layer 575 over and/or on exposed portions of the surface of the substrate 570 and the surface of the micromirror 571 of FIG. 7, according to one or more embodiments of the invention. As shown, the patterned non-wettable layer may be formed around the patterned wettable layer portions. If the material of the surface of the substrate and/or the micromirror are sufficiently non-wettable, compared to the patterned wettable layer, the patterned non-wettable layer may optionally be omitted.

As used herein, the term "non-wettable layer" is to be interpreted in a relative sense, rather than absolute sense. In particular, it is not required that the non-wettable layer is not wet by a liquid lens material, but rather it may be less capable of being wetted by a liquid material used to form the microlens, or a material of the microlens, than the overlying patterned wettable layer, discussed above. The non-wettable layer may include one or more materials having phobicity rather than philicity for a liquid material used to form the microlens, or a material of the microlens.

For polymeric or otherwise organic liquid lens materials, types of materials that are suitable for inclusion in the patterned non-wettable layer include, but are not limited to, materials including one or more halogens, such as, for example, fluorine. In one or more embodiments, the surface of the substrate and micromirror around the wettable foundations may be treated with a fluorine plasma to introduce fluorine over the surface and micromirror around the patterned wettable layer. In one or more not necessarily different embodiments, a thin layer of a fluoropolymer, such as, for example, polytetrafluoroethylene, or another material including fluorine, may be deposited or otherwise formed over the surface. Other methods and materials for introducing materials including fluorine or other non-wettable materials may also optionally be used.

The invention is not limited to any known thickness of the non-wettable layer. A thickness ranging from about a monolayer to several micrometers may be sufficient. If the non-wettable layer is included over the micromirror, then a thin layer may be appropriate to provide greater transparency.

Figure 9:
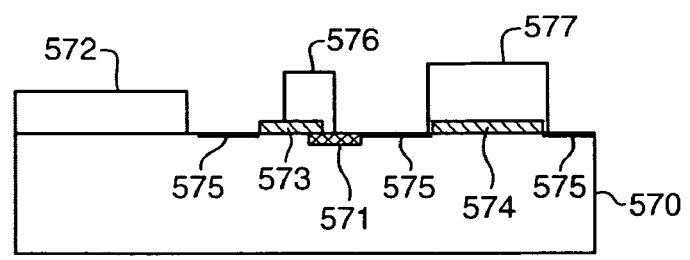
FIG. 9 shows introducing a lens material over the patterned wettable layer of FIG. 8, according to one or more embodiments of the invention.

FIG. 9 shows introducing a lens material 576, 577 over the patterned wettable layer 573, 574 of FIG. 8, according to one or more embodiments of the invention. Suitable lens materials include, but are not limited to, organic materials that are transparent at the wavelength range or ranges of operation. Suitable examples include polymeric materials, such as, for example, thermoplastics, and resists. An example of a suitable transparent organic resist is SJR5740, which is commercially available from Rohm and Haas Electronic Materials, of Sunnyvale, Calif. A suitable transparent organic polymeric material is benzocyclobutene. Another suitable transparent polymeric material is polycarbonate. In one or more embodiments of the invention, a material having a lower melting point temperature than the waveguide, patterned wettable layer, and micromirror, may be used.

Suitable methods of introducing the lens materials include, but are not limited to, printing, such as, for example, inkjet printing or screen printing, and dispensing. Another suitable method of introducing the lens materials includes forming a layer of the lens material over at least a region including the patterned wettable layer, such as, for example, by spin coating or deposition, and then lithographically patterning and developing the layer in order to leave a patterned lens material layer over the patterned wettable layer. The layer may also optionally be patterned by etching according to a patterned overlying resist layer.

In one or more embodiments of the invention, the amount of lens material that may be introduced may be sufficient to form a hemi-spheroidal lens over each of the portions of the patterned wettable layer. As shown, it is not required that the lens material be introduced precisely over the patterned wettable layer, although it may be appropriate to introduce at least some of each of the lens materials in contact with the patterned wettable layer.

Figure 10:
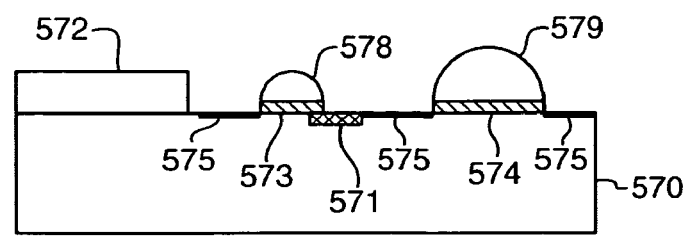
FIG. 10 shows reshaping the lens material of FIG. 9 to form a hemi-spheroidal collimating microlens and a hemi-spheroidal focusing microlens, according to one or more embodiments of the invention.

FIG. 10 shows reshaping the lens material 576, 577 of FIG. 9 to form a hemi-spheroidal collimating microlens 578 and a hemi-spheroidal focusing microlens 579, according to one or more embodiments of the invention. In one or more embodiments, the lens material may be heated, such as, for example, to at least its softening and/or melting point temperature. At or around the melting point temperature, or higher, the lens material, such as, for example, a thermoplastic or otherwise shapeable polymeric material, may soften, and melt and/or reflow.

The melted lens material may wet the patterned wettable layer and may reshape due at least in part to surface tension. Surface tension may represent an attractive force exerted upon the surface molecules of a liquid by molecules beneath the surface that tends to draw the surface molecules in the bulk of the liquid and give the liquid a shape that has reduced surface area. The surface tension may tend to round corners and flatten surfaces to form smooth curved surfaces that are suitable for lenses. As shown, the surface tension may tend to form hemi-spheroids over the patterned wettable layer portions. As further shown, the surface tension may tend to draw the lens material off the non-wettable layer and substantially center the lens material over the patterned wettable layer. The reshaped liquid lens material may then be solidified in situ, such as, for example, by cooling to ambient temperature or at least below the melting point temperature.

The scope of the invention is not limited to forming the lenses by melting or reflow. In one or more alternate embodiments of the invention, a liquid lens material may be introduced over the patterned wettable layer, may wet the patterned wettable layer, may reshape autonomously due at least in part to surface tension, and may then be solidified, such as, for example, by polymerization, such as, for example initiated by an exposure to ultraviolet or other actinic radiation, or otherwise through reaction or cooling. Still further, there is no requirement that a polymeric lens material be used. A pre-formed lens, organic or inorganic, such as, for example, silicon, glass, quartz, or sapphire, may be attached or otherwise coupled with the surface of the substrate, instead of being formed in situ thereon.

Many modifications and adaptations to the above-described method are contemplated. In one aspect, one or more operations may optionally be removed from the method. For example, the formation of the micromirror and collimating microlens may be omitted to generate a different apparatus. As another example, reflow is not required and a preformed lens may be attached. As a further example, the formation of the patterned wettable layer and/or the non-wettable layer may optionally be omitted. These may often help to provide a more centered and shaped lens, but are not required. In another aspect, one or more operations may optionally be performed in a different sequence. For example, in one or more embodiments of the invention, the non-wettable layer may be formed over the surface of the substrate earlier in the sequence, such as, for example, prior to the formation of the patterned wettable layer. As another example, in one or more embodiments of the invention, the waveguide and the patterned wettable layer may be formed concurrently and of the same patterned layer and/or material, such as, for example, benzocyclobutene. Still further, the waveguide may be formed from as early as prior to forming the micromirror to as late as after forming the microlenses. These are just a few of the contemplated modifications.

In one or more embodiments of the invention, it is contemplated that a shape of the wettable material may be used to control or at least modify a shape of the microlens. In one or more embodiments of the invention, the patterned wettable layer portions may have shapes that are other than circular discs. For example, in one or more embodiments of the invention, the patterned wettable layer portions may have shapes to provide aspheric lenses, or other non-hemi-spheroidal lenses. Suitable shapes may be determined by those skilled in the art through modeling and simulation, numerical optimization, empirical investigations, and the like. In one or more embodiments of the invention, the shape of the wettable material or patterned layer portions may be sufficient to provide a lens having reduced spherical aberration relative to a hemi-spheroidal lens.

Figure 11:
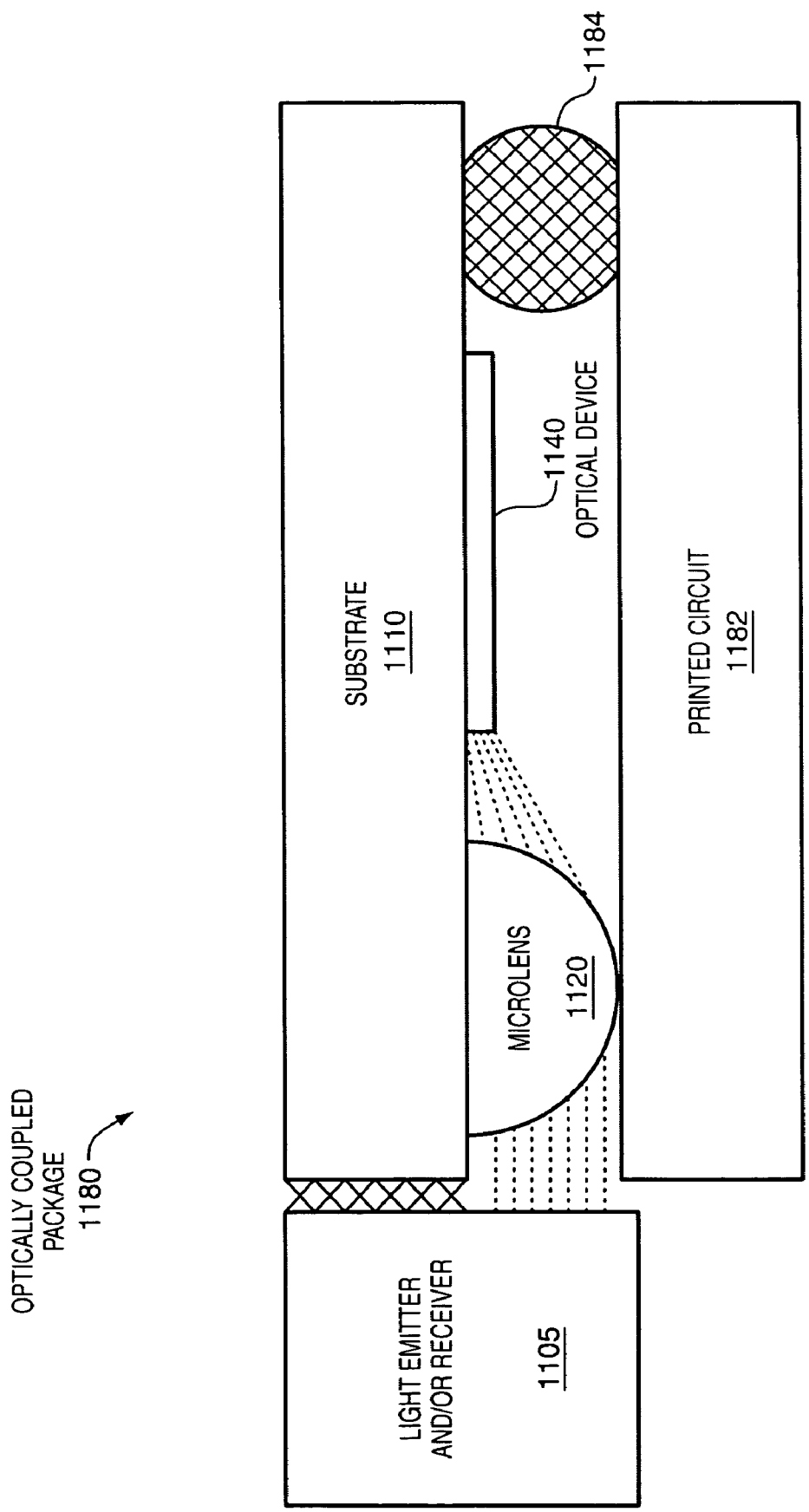
FIG. 11 shows an enlarged cross-sectional view of an optically coupled package, according to one or more embodiments of the invention.

In one or more embodiments of the invention, the optical paths and couplings disclosed herein may be used to optically couple a package with a light emitter and/or receiver of an optical connector. FIG. 11 shows an enlarged cross-sectional view of an optically coupled package 1180, according to one or more embodiments of the invention. A package includes an optical apparatus similar to that shown in FIG. 1, which is physically and optically coupled with a light emitter and/or receiver 1105. The optical apparatus includes a substrate 1110, an on-substrate focusing and/or collimating microlens 1120 and an on-substrate optical device 1140. These components, as well as the light emitter, may optionally have one or more or all of the characteristics of the correspondingly named components previously described. In packages or otherwise, arrays or other pluralities of the optical paths and couplings may also optionally be included in an apparatus to provide multiple different optical signaling paths The package further includes a printed circuit 1182, such as, for example, a printed circuit board, flexible printed circuit, or printed wiring board, that may be coupled with the substrate through interconnects 1184, such as, for example solder bumps. The package has the orientation of a flip-chip package, although the scope of the invention is not limited in this respect.

In some embodiments of the invention, it may be beneficial to utilize a larger diameter spheroidal or hemi-spheroidal microlens. A larger diameter hemi-spheroidal lens may tend to provide reduced spherical aberration and/or numerical aperture, which may benefit imaging and other potential applications of embodiments of the invention. However, in flip-chip and other packages, as well as in other embodiments, the larger diameter may tend to increase the standoff height of the substrate in the package. Several approaches are contemplated to help allow the use of a larger diameter lens while maintaining a particular standoff height.

Figure 12:
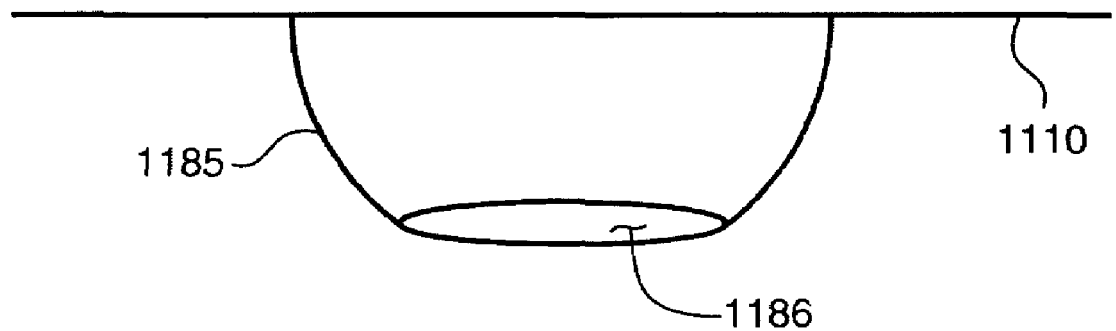
FIG. 12 shows a microlens having a planar surface, according to one or more embodiments of the invention.

FIG. 12 shows a simplified, enlarged, perspective view of a substrate 1110, such as, for example, a die or other microelectronic device, an optionally hemi-spheroidal microlens 1185 coupled with the substrate, and a planar surface 1186 of the microlens opposite an equatorial base plane thereof, according to one or more embodiments of the invention. In one or more embodiments of the invention, the planar surface may be formed by removing a cap or other portion of the microlens, such as, for example, by laser ablation, microtoming, etching, or polishing, to name just a few examples. Alternatively, the planar surface may be formed by flattening the cap of the microlens, such as, for example, by coining. The planar surface may abut a surface of a printed circuit and the lack of the cap may help to reduce standoff.

Figure 13:
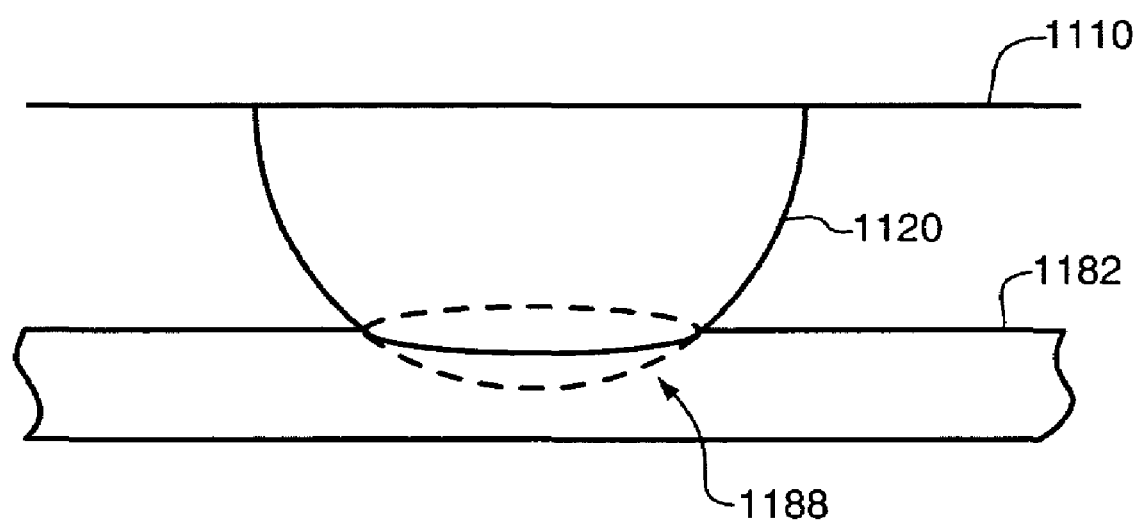
FIG. 13 shows a printed circuit having a cavity to accommodate a portion of a microlens, according to one or more embodiments of the invention.

FIG. 13 shows a simplified, enlarged, perspective view of a substrate 1110, an optionally hemi-spheroidal microlens 1120 coupled with the substrate, a printed circuit 1182, such as, for example, a printed circuit board, in face-to-face alignment with the substrate, and a cavity 1188 in the printed circuit to accommodate a cap or other portion of the microlens, according to one or more embodiments of the invention. The cavity may match or otherwise correspond in position and optionally in size, shape, and/or other attributes, with the cap of the microlens. In one or more embodiments of the invention, the cavity may be formed by removing material of the printed circuit, such as, for example, by laser ablation, etching, drilling, or milling, to name just a few examples. Alternatively, the cavity may be molded, depressed, embossed, or otherwise formed in the printed circuit.

The packages disclosed herein may be included in a variety of electronic device. Suitable examples of electronic devices include, but are not limited to, computer systems, networking equipment, communications equipment, wireless devices, and the like.

Figure 14:
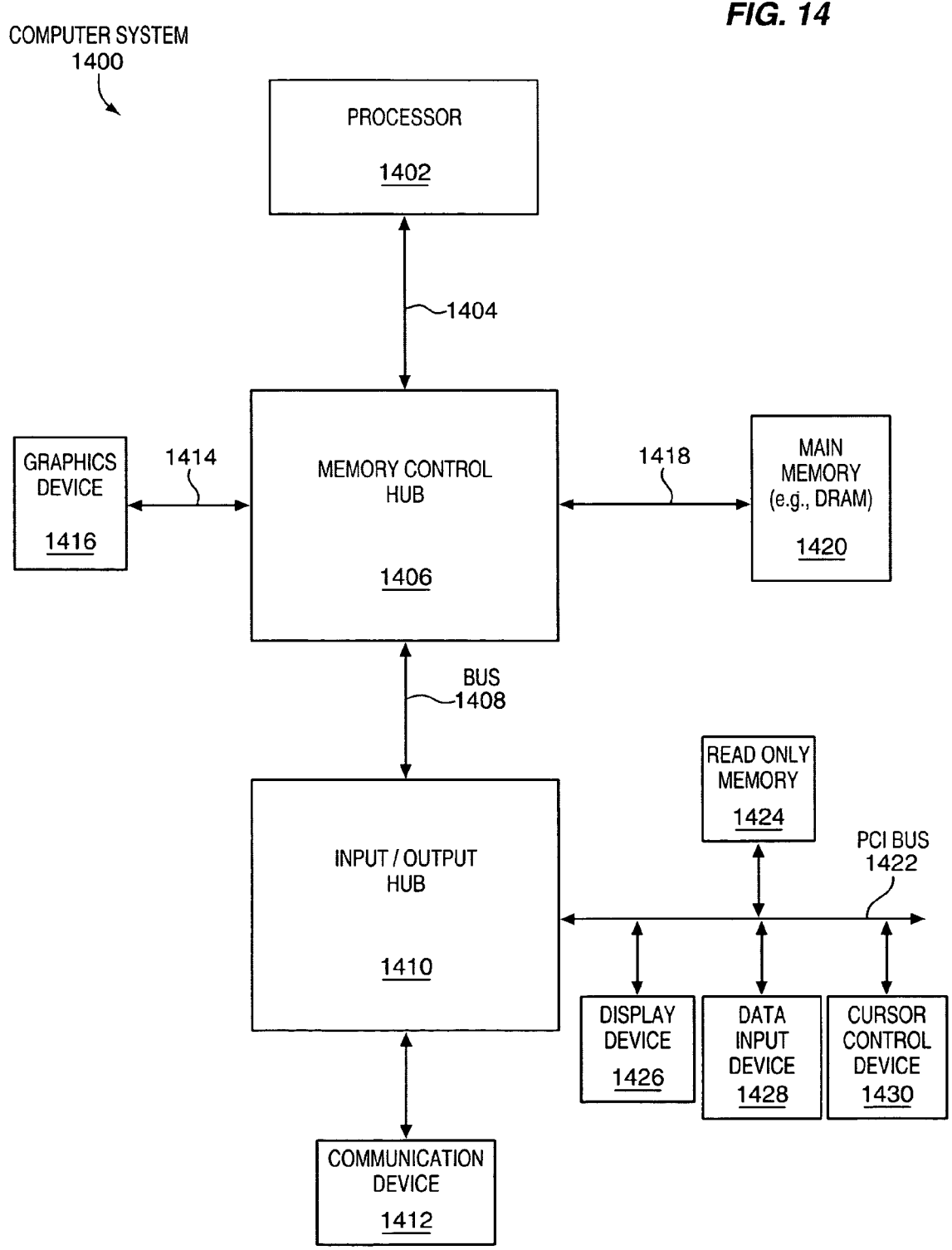
FIG. 14 shows a block diagram of a computer system in which one or more embodiments of the invention may be implemented.

FIG. 14 shows a block diagram of a computer system 1400, according to one or more embodiments of the invention. As used herein, a "system" or "computer system" may include an apparatus having hardware and/or software for processing data. The computer system may include, but is not limited to, a portable, laptop, desktop, server, or mainframe computer. The computer system represents one possible computer system for implementing one or more embodiments of the present invention, however other computer systems and variations of the computer system are also possible.

The computer system includes a memory control hub 1406 coupled with an input/output hub 1410 through a first bus 1408, which may communicate information between the hubs. A processor 1402, which may process information, is coupled with the memory control hub through a second bus 1404, such as, for example, a front-side bus. In one or more embodiments of the invention, the processor may include a microprocessor available from Intel Corporation, of Santa Clara, Calif.

In one or more embodiments of the invention, the processor may be optically coupled with the memory control hub, such as, for example, using the optical paths and couplings as disclosed herein. Alternatively, in one or more other embodiments, processor and memory control hub may be combined in a single microelectronic device. In such embodiments, the microelectronic device may be optically coupled with another computer system component, such as, for example, a memory, by using the optical paths and couplings as disclosed herein. Still further, in one or more embodiments of the invention, the processor may be optically coupled with a second processor through the optical paths and couplings as disclosed herein. The optical couplings disclosed herein may provide chip-to-chip bus couplings. However, the scope of the invention is not limited to just these couplings.

The computer system further includes a main memory 1420, such as, for example, a random access memory (RAM) or other dynamic storage device, coupled with the memory control hub via a third bus 1418. The main memory may store information including instructions to be executed by the processor. Different types of RAM memory that are included in some, but not all computer systems, include, but are not limited to, static-RAM (SRAM) and dynamic-RAM (DRAM). A graphics device 1416 may optionally be coupled with the memory control hub via a fourth bus 1414.

The computer system also includes a read only memory (ROM) 1424 coupled with the input/output hub through a fifth bus 1422, such as, for example, a PCI (peripheral components interconnect) bus. The read only memory may store static information and instructions for the processor, such as, for example, the basic input-output system (BIOS). Different types of memory that are included in some, but not all, computer systems include Flash memory, programmable ROM (PROM), erasable-and-programmable ROM (EPROM), and electrically-erasable-and-programmable ROM (EEPROM).

As shown, a number of input and/or output devices may also optionally be coupled with the input/output hub via the fifth bus. A display device 1426, such as, for example, a cathode ray tube (CRT) or liquid crystal display (LCD), may be included to display information to an end user. A data input device 1428, such as, for example, a keyboard or other alphanumeric input device including alphanumeric and other keys, may be included to communicate information and command selections to the processor. A cursor control device 1430, such as, for example, a mouse, trackball, or cursor direction keys, may be included to communicate direction information and command selections to the processor, and to control cursor movement on the display device.

A communication device 1412 may also be coupled with the input/output hub. As shown, the communication device may optionally be coupled with the input/output hub through a sixth bus, such as, for example, a high-speed bus. Communication devices are employed in some, but not all, computer systems. Depending upon the particular implementation, the communication device may include a modem, a network interface card, or other well-known interface devices, such as, for example, those used for coupling with Ethernet, token ring, or other types of physical attachment for purposes of providing a communication link to support a local or wide area network, for example. In one or more embodiments of the invention, the communication device may optionally include optical paths and couplings as disclosed herein in order to receive high-speed information from an optical network.

Other devices may also optionally be included. For example, a mass storage device, such as, for example, a magnetic disk, zip, or optical disc and its corresponding drive may also be coupled with the computer system to store information and instructions. In one or more embodiments of the invention, any one or more of the components of the computer system may optionally be interconnected with a hub, bridge, or switch, or with another component by using the optical paths and couplings as disclosed herein.

Now, the scope of the invention is not limited to optically coupling packages. In one or more other embodiments of the invention, a printed circuit board may be optically coupled with another component, such as, for example, another printed circuit board. Alternatively, a rack may be optically coupled with another component, such as, for example, another rack. These are just a few illustrative types of optical couplings, and others are contemplated.

In the description above, for the purposes of explanation, numerous specific details have been set forth in order to provide a thorough understanding of the embodiments of the invention. Other embodiments may be practiced without some of these specific details. In other instances, well-known circuits, structures, devices, and techniques have been shown in block diagram form or without detail in order not to obscure the understanding of this description.

Many of the methods are described in their most basic form, but operations may be added to or deleted from the methods. Many further modifications and adaptations may be made. The particular embodiments are not provided to limit the invention but to illustrate it. The scope of the invention is not to be determined by the specific examples provided above but by the claims below.

In the claims, any element that does not explicitly state "means for" performing a specified function, or "step for" performing a specified function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While the invention has been described in terms of several embodiments, the invention is not limited to the embodiments described, but may be practiced with modification and alteration within the spirit and scope of the appended claims. The description is thus to be regarded as illustrative instead of limiting.

What is claimed is:

1. An apparatus comprising:
   a substrate having a surface;
   an on-substrate lens coupled with the substrate to receive light from an off-substrate light emitter and focus the light toward a focal point including towards the surface of the substrate;
   an on-substrate optical device coupled with the substrate proximate the focal point to receive the focused light;
   a circuit board that is coupled with the substrate in face-to-face alignment with the substrate; and
   a cavity in the circuit board to accommodate a cap of the lens.

2. An apparatus comprising:
   a substrate having a surface;
   an on-substrate lens coupled with the substrate to receive light from an off-substrate light emitter and focus the light toward a focal point including towards the surface of the substrate;
   an on-substrate optical device coupled with the substrate proximate the focal point to receive the focused light;
   a patterned wettable layer over the surface of the substrate, the patterned wettable layer including a portion that is adjacent to the lens; and
   a patterned non-wettable layer over the surface of the substrate around the patterned wettable layer.

3. The apparatus of claim 2, wherein the portion of the patterned wettable layer comprises a shape to provide an aspheric lens.

4. A method comprising:
   aligning an off-substrate light emitter with a hemi-spheroidal lens that is coupled with a surface of a substrate so that light from the off-substrate light emitter would be provided to the hemi-spheroidal lens in a direction that is substantially parallel to the surface of the substrate, wherein said aligning comprises using a single passive alignment operation; and
   fastening the off-substrate light emitter with the substrate.

5. A method comprising:
   aligning an off-substrate light emitter with a hemi-spheroidal lens that is coupled with a surface of a substrate so that light from the off-substrate light emitter would be provided to the hemi-spheroidal lens in a direction that is substantially parallel to the surface of the substrate; and
   fastening the off-substrate light emitter with the substrate, wherein said fastening comprises using an adhesive to fasten the off-substrate light emitter with the substrate.

6. An apparatus comprising:
   a substrate having a surface;
   a first material over at least a portion of the surface;
   a second material over at least a portion of the surface around the first material; and
   a microlens on the first material, wherein the first material is more capable of being wetted by a liquid material used to form the microlens than the second material.

7. The apparatus of claim 6, wherein the first material comprises a shape that is not a circular disc.

8. The apparatus of claim 6, wherein the first material comprises a shape to provide an aspheric lens.

9. The apparatus of claim 6, wherein the microlens comprises a thermoplastic, and wherein the second material comprises fluorine.

10. The apparatus of claim 6, wherein the substrate comprises a microelectronic device having an optical device proximate a focal point of the microlens.

11. The apparatus of claim 6, further comprising an off-substrate light emitter to provide light to the microlens in a direction that is substantially parallel to the surface of the substrate.

12. A method comprising:
    forming a first material over at least a portion of a surface of a substrate;
    forming a second material over at least a portion of the surface around the first material; and
    forming a microlens on the first material by introducing a lens material on the first material, wetting the first material with the lens material, shaping the lens material based at least in part on surface tension, and solidifying the shaped lens material.

13. The method of claim 12, wherein said forming the first material comprises forming a first material comprising a shape to provide an aspheric microlens.

14. The method of claim 12, wherein said forming the second material comprises introducing fluorine over the surface.

15. The method of claim 12, wherein said introducing the lens material comprises introducing a thermoplastic, and wherein said wetting comprises reflowing the thermoplastic lens material by heating the thermoplastic lens material.

16. The method of claim 12, wherein said introducing the lens material comprises introducing the lens material by an approach selected from the group consisting of inkjet printing, screen printing, and spin coating followed by lithographic patterning and development.

* * * * *